C. P. HALE.
Hay Loader.
No. 95,680. Patented Oct. 12, 1869.
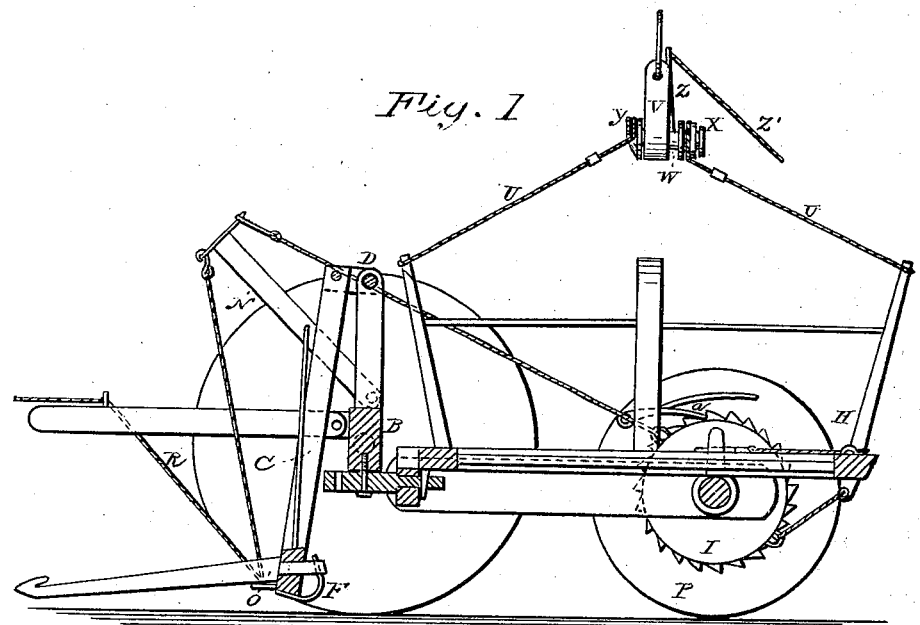
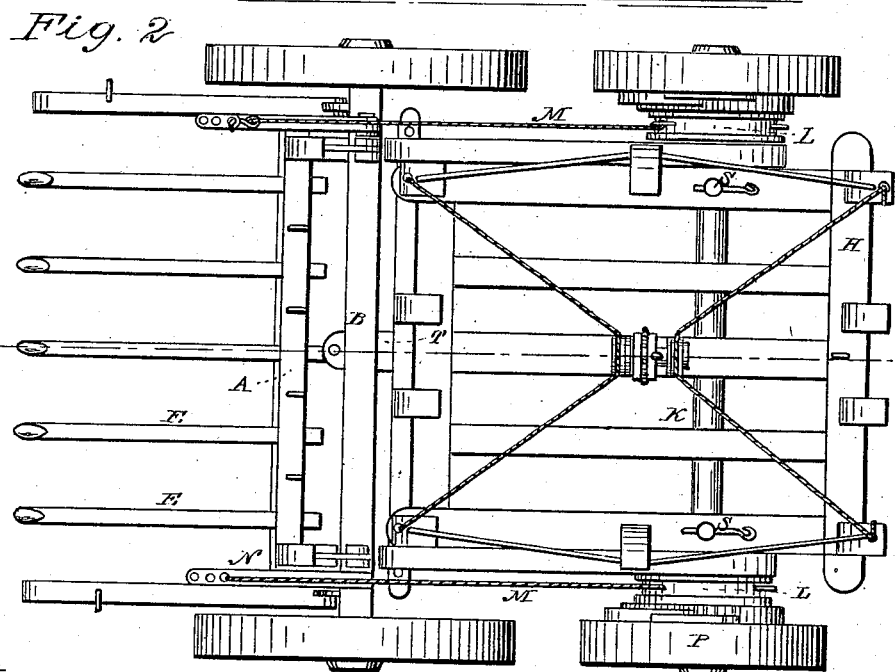

United States Patent Office.

CHARLES P. HALE, OF CALHOUN, KENTUCKY.

Letters Patent No. 95,680, dated October 12, 1869.

---

IMPROVEMENT IN HAY-LOADERS.

---

The Schedule referred to in these Letters Patent and making part of the same.

---

*To all whom it may concern:*

Be it known that I, CHARLES P. HALE, of Calhoun, in the county of McLean, and State of Kentucky, have invented a new and improved Raking, Loading, and Elevating-Apparatus; and I do hereby declare that the following is a full, clear, and exact description thereof, which will enable others skilled in the art to make and use the same, reference being had to the accompanying drawings, forming part of this specification.

This invention relates to improvements in raking or gathering, loading, and elevating-apparatus, for hay, straw, sand, and other substance to be gathered from the ground, for loading, transporting, and elevating to a stack, building, or other place.

It consists in an improved arrangement on a truck of a rake, or gathering-instrument, which also delivers the substance gathered into a rack, and a receiving and delivering, or elevating-rack, with connecting and tripping-gear for a hoisting-apparatus, all as hereinafter more fully specified.

Figure 1 represents a longitudinal sectional elevation of my improved apparatus; and Figure 2 represents a plan view of the same.

Similar letters of reference indicate corresponding parts.

A represents a rake-head, suspended in front of the front axle B of a truck, by arms C, hinged to the tops of posts D, rising a suitable distance from the said axle.

The teeth E of this rake are so connected to the rake-head as to rise and fall, at their outer ends, independently of each other, and they are provided with springs F, which have a tendency to press the front ends down to the ground.

G represents rods rising upward from the rake-head, to prevent the hay gathered on the rake-teeth from escaping behind them.

When the rake has gathered a load of hay or other substance, it is swung up over the top of the posts D, to deliver its load into the rack H. This is accomplished when the truck is moved backward, by the aid of ratchet-wheels I, working loosely on the rear axle K, drums L, cords M, and hinged braces N, supported on the front axle, all actuated by the rear wheels of the truck.

The said cords are connected to the drums, the swinging ends of the braces N, and to the rake-head at O.

The rear wheels P of the truck are provided with spring-pawls Q, which engage the ratchets when moving backward, and thus turn the drums L, to wind up the cords, and swing the rake over, to dump its load into the rack.

This backward movement is effected by backing up the team for a short distance.

After dumping, the rake is thrown forward again, by the forward movement of the team, through the action of a cord, R, connected to the rake-head, and in any suitable way, to the harness of the team, so as to slacken enough, when the team backs up, to permit the rake to swing up, but to draw the rake back when they move forward; or the said cord may be operated by an attendant.

The rack H is designed to be hoisted off the truck, for elevating its load, and is therefore connected to pins S, rising from the rear axle, and rests at the front end on the reach T of the truck.

The top of the rack is connected, by cords U, to a hoisting-block, V, by a revolving or oscillating shaft, W, having grooved blocks or rollers X Y, at the ends, in the grooves of which loops of the cords U are secured.

The outer flange of the roller Y is removed from one side, so that when that side is turned up, the loop will slip off, and permit one end of the rack to fall, for dumping.

The shaft W is provided with an arm, Z, for holding it in the right position for holding the cords for elevating, and for tripping when elevated. It springs into a vertical groove in the block V, for holding the shaft, and is provided with a trip-cord, Z', for pulling it out of the groove, for dumping.

Having thus described my invention,

I claim as new, and desire to secure by Letters Patent—

1. The arrangement of the ratchet-wheels I, and pawls, with the wheels P, the cords M, swinging arms N, pulleys Y X, loop V, and rake, all substantially as specified.

2. The combination, with the detachable rack H, of the looped cords U, blocks V, shaft W, blocks X Y, and trip-lever Z, when all arranged substantially as specified.

CHARLES P. HALE.

Witnesses:
ALF. C. TANNER,
L. G. ALEXANDER.